United States Patent [19]

Pallaske

[11] Patent Number: 4,941,356
[45] Date of Patent: Jul. 17, 1990

[54] PROCESS FOR DETECTING INSECTS
[75] Inventor: Michael Pallaske, Kempen, Fed. Rep. of Germany
[73] Assignee: DESOWAG Materialschutz GmbH, Dusseldorf, Fed. Rep. of Germany
[21] Appl. No.: 263,763
[22] Filed: Oct. 28, 1988
[30] Foreign Application Priority Data Oct. 28, 1987 [DE] Fed. Rep. of Germany ....... 3736515

[51] Int. Cl.$^5$ ............................................. G01N 29/04
[52] U.S. Cl. .................................................. 73/587
[58] Field of Search .......................... 73/570, 587, 602; 367/139

[56] References Cited

U.S. PATENT DOCUMENTS

| 3,891,962 | 6/1975 | White | 367/139 |
| 4,219,884 | 8/1980 | De Santis | 367/139 |
| 4,671,114 | 6/1987 | Litzkow et al. | 73/587 |

FOREIGN PATENT DOCUMENTS 1175719 12/1969 United Kingdom .

OTHER PUBLICATIONS

Schmidt, "A Test Method with the Subterranean Termite Reticulitermes on Tropical Woods", *Wood as Raw Material and Workpiece*, 1968, pp. 342–343.

*Primary Examiner*—Hezron E. Williams
*Assistant Examiner*—Louis M. Arana
*Attorney, Agent, or Firm*—Foley & Lardner, Schwartz, Jeffery, Schwaab, Mack, Blumenthal & Evans

[57] ABSTRACT

The process of detecting the presence of insects or insect larvae in a solid substrate, e.g. wood, in which the behavioral patterns of the insects to be detected are established. These behavioral patterns are compared to actual noise and vibration patterns detected in the substrate, after extraneous noise is filtered from the actually detected information and the data has been converted to analog form. The actual analysis is performed by a microcomputer. The microcomputer analysis yields an output indicative of damage or movement activity or lack of such activity.

7 Claims, 3 Drawing Sheets

PROCESS FOR DETECTING INSECTS

BACKGROUND OF THE INVENTION

This invention relates to a process and device for detecting the presence of insects or insect larvae in a solid substrate, e.g. wood, by observing their specific behavior (behavioral pattern).

Insects and insect larvae living in wood cause, in some cases, considerable damage to timber and artificial objects. The early detection of noxious organisms in wood is rendered difficult by the lack of effective tests operating free from interference, as is the establishment of the effectiveness of treatment measures. The standard specifications, which are associated with long exposure times of the test organisms, for the determination of the effectiveness of wood protection agents, serve, as a rule, also as a—time—intensive—basis for the testing of new active substances in the foreground of production. In this case, too, there is a lack of test processes with which changes in the behavior of test organisms can be detected rapidly and reliably.

In industrial practice, a determination of the behavior of insects (insect larvae) living in wood is
5 undertaken in accordance with the standards, DIN EN 20, DIN EN 21, DIN EN 22 and DIN EN 47. In this case, the number of surviving test organisms is employed to draw conclusions concerning changes in behavior; furthermore, these standards permit observations using X-ray systems. In basic biological research, since the invention of the carbon microphone, repeated use has been made of devices which make audible, or record in a nonspecific manner, the noises generated by insects (insect larvae) living in wood. Note A. E. EMMERSON and R. C. SIMPSON 1929 in Science, 1929, Vol. 69, pages 648-649.

The above indicated DIN processes for the determination of changes in behavior of insects or insect larvae living in wood require, in some cases, very long exposure times of the test organisms (between 6 and 52 weeks, depending upon the type of organism) and, in such a case, do not permit any guaranteed statements concerning the temporal progression of changes in behavior. An unambiguous determination of the current behavior of the test organisms is (without suspending the test), therefore, impossible.

The processes employed in basic biological research for a specific set of problems record noises and vibrations in an entirely non-specific manner. In the case of the construction of the test arrangement in low-noise and low-vibration chambers, it is possible to detect in a controlled manner the noises and vibrations generated by insects (insect larvae) living in the wood.

SUMMARY OF THE INVENTION

The object of the process, according to the invention, is to detect the presence and behavior of insects or insect larvae living in a solid substrate, preferably wood, with the aid of simple means, in a manner free from interference.

According to the invention, this object is achieved in that the substrate vibrations generated by the insects or insect larvae, or the sound generated by the insects or insect larvae, are measured and correlated with the behavior (behavioral pattern) causing the substrate vibrations or sound, and in that the result of this correlation is automatically displayed.

Before carrying out the process, according to the invention, in the first instance, the behavioral repertoire of the organism is established by observation under conditions which are as natural as possible. The recording of the substrate vibrations or sound phenomena generated by the organism takes place contemporaneously with the observations. After determination of the behavioral repertoire, the signals which are characteristic of each relevant behavior (behavioral pattern) are investigated for common features in duration, form and spectrum. Those signal properties which describe a behavior in a manner which is as far as possible unambiguous and thus delimit it optimally as against the signal properties of the other behavior patterns, are established as a "prescribed reference." The signal processing steps leading to the prescribed references are established as an "evaluation specification". Both a "prescribed reference" and also an "evaluation specification" are correlated with each relevant behavior from the behavioral repertoire of the organism.

The process according to the invention is implemented by quasi-simultaneous execution of the signal detection, of the "evaluation specifications", of the testing against the "prescribed references" and the resultant output is realized by means of the device claimed. In this manner (also in signal mixtures), patterns typical of behavior are detected with very great reliability and are correctly correlated with the causative behavior. The presence of an active organism can be detected immediately, and the current behavior of the organism can be interrogated at any time, since "on-line" results are available.

According to the invention, in place of the substrate vibrations generated by the organisms, the sound generated by them, preferably ultrasound, can be used for the detection of their behavioral patterns, in the event that a contact-free process is expedient.

For test environments with high interference levels or for signals which are very difficult to distinguish, according to the invention, both the substrate vibrations generated by the organisms and also the sound generated by them, preferably ultrasound, are used for the detection of their behavioral patterns. The simultaneous evaluation of both signals increases the reliability of the process according to the invention, and the susceptibility to interference is further reduced.

According to a preferred embodiment of the process claimed according to the invention, in the frequency range from 0.01 mHz to 150 kHz, the frequency signals of the substrate vibrations generated by the insects or insect larvae or of the sound generated by the insects or insect larvae, possibly together with the vibration or sound frequency signals (interfering frequency signals) originating from the environment, after possibly preceding amplification, are measured or recorded, are evaluated after filtering out the interfering frequency signals, and are subsequently compared with one or more prescribed references, preferably signal form or level frequency, which are obtained in the frequency range form 0.01 mHz to 150 kHz, preferably from 100 Hz to 15 kHz, and which are characteristic of the behavior of the pertinent noxious insects or insect larvae in the solid substrate, and the result is automatically indicated.

According to a particular refinement of the process according to the invention, behavioral patterns are evaluated, which take place as reactions of the organisms to special specific or alien vibrations or sound phenomena.

In this case, in the first instance such signals are transmitted in an appropriate form into the substrate, preferably wood, and subsequently the reactions of the test organisms are evaluated. This particular refinement is predominantly used in the case of insects living in the wood which have available specifically associated communication mechanisms (e.g. knocking signals in the case of termites). In this case, vibration frequency signals or sound frequency signals situated in the frequency range form 1 mHz to 150 kHz, preferably form 1 Hz to 15 kHz, are preferably transmitted.

It is, accordingly, an object of the invention to provide a system for the detection of insects or insect larvae living in a solid substrate, usually wood.

It is a further object of the invention to provide a sound and vibration detecting system for determining the presence of insects or larvae in a wooden structure.

It is another object of the invention to provide a method for detecting the destruction of wooden structures by analyzing the sound and vibration patterns of wood-eating pests and comparing them to the sound and vibration patterns of on-going activity.

It is still another object of the invention to provide a method, using a microcomputer, to detect pest destruction in a wooden structure by analysis of insect damage and movement activity.

BRIEF DESCRIPTION OF THE DRAWINGS

Further details of the process according to the invention, as well as the device according to the invention, for carrying out the process, are described in greater detail with reference to the accompanying drawings.

In the drawings.

DETAILED DESCRIPTION OF THE PREFERRED EMBODIMENTS

Figure 1:
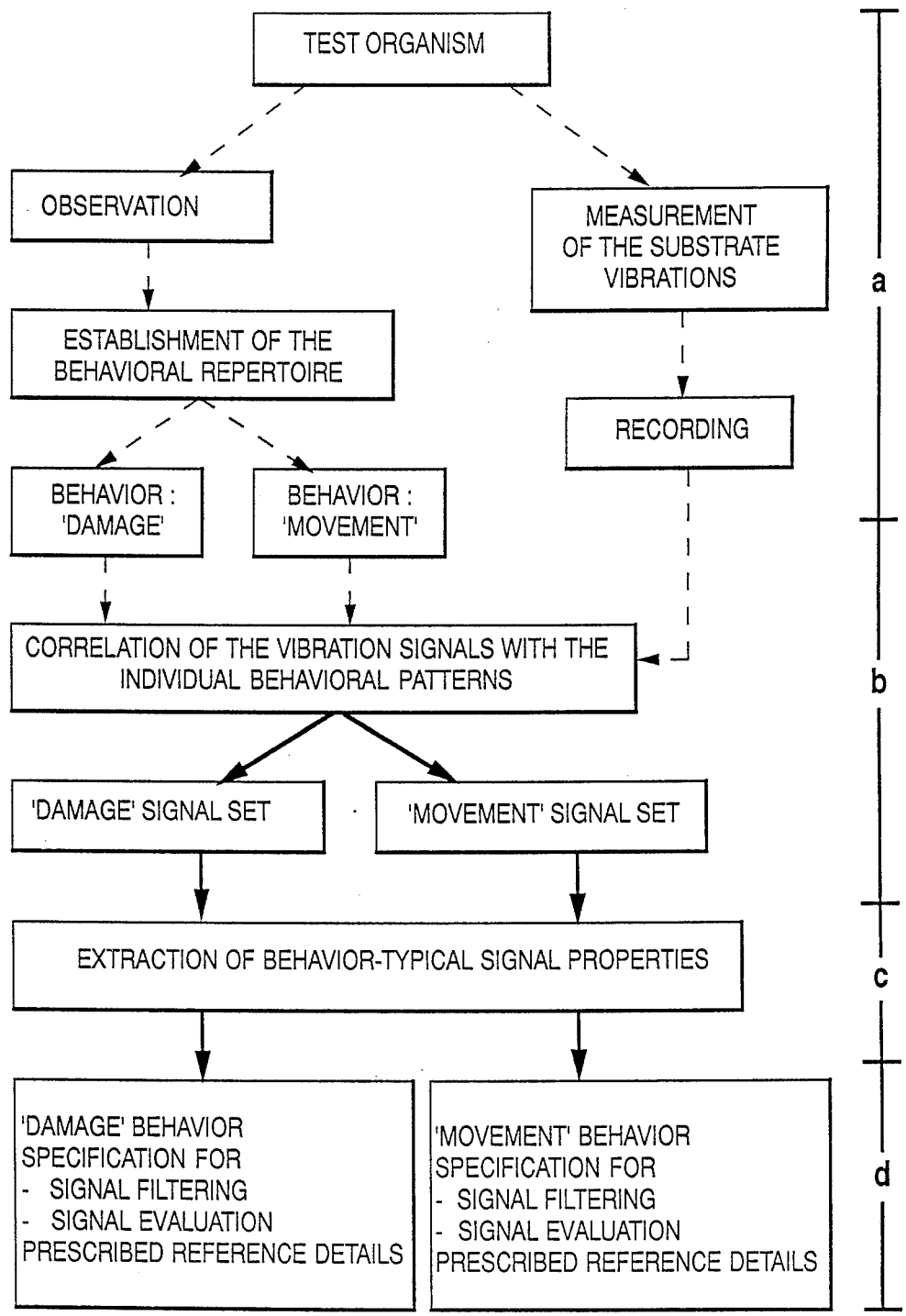
FIG. 1 shows the determination of valuation specifications and prescribed references as a basis for the implementation of the process according to the invention using the substrate vibrations or sounds generated by the organisms.

FIG. 1 shows diagrammatically the progress of the preliminary operations typical of the process, which are required for an automatic detection of behavioral patterns.

In the first instance, the behavioral repertoire of the desired organism species is established by observation (the left hand side of FIG. 1a, dotted-line sequence). For this purpose, the organisms are, as a rule, observed in red light, and under optimal temperature and optimal humidity conditions, in glass-covered damage passages, and their activities are recorded in a protocol. Contemporaneously with these observations, the substrate vibrations generated by the organisms are measured, recorded and archived (the right hand side of FIG. 1a, dashed-line sequence).

After the behavioral repertoire of the organisms has been established (in FIGS. 1b, and 2 consisting, for example, of the two behavioral patterns "damage" and "movement"), the archived vibration signals are assigned to the behavioral patterns in accordance with the observation protocol. Thus, for each behavioral pattern a collection of vibration signals (FIG. 1b) is created, which represents the basic data material for the further process steps.

The object of the process step (FIG. 1c), which now follows, is the ascertainment of signal processing specifications with which the signals of a behavioral pattern, on the one hand, can be perfectly detected and, on the other hand, can be optimally delimited against the signals of the other behavioral patterns (and against interfering noises). In order to ascertain such signal processing specifications, a great variety of courses can be adopted, as described in literature, e.g. W. WEHERMANN in "Correlation Technology", Ernst-Verlag 1980; H. SPATH in "Cluster Analysis Algorithms", Oldenburg-Verlag 1977. Within the context of the present invention, the following procedure has proved to be effective:

1. Frequency analysis of all vibration signals of a behavioral pattern.
2. Selection of a frequency band which is represented in all signals of this behavioral pattern.
3. Determination of the "typical" signal form in this frequency band by filtering, and communication of all signals of this behavioral pattern.
4. Establishment of criteria for the detection of the signal commencement and the signal end (H. NEY in "AUTOMATIC VOICEPRINT COMPARISON BY COMPUTER. Int. Conf. Security through Science and Engineering, 1980, 121–130).
5. Signal comparison of all (filtered) signals of this behavioral pattern against the "typical" signal form according to the process of dynamic optimization (dynamic programming), and determination of the (permissible) similarity coefficients within the behavioral pattern (H. SPATH 1977 Loc. cit., H. SAKOE & S. CHIBA in "Dynamic Programming Algorithm Optimization for spoken word recognition. IEE Trans. on Acoustics, Speech and Signal Processing, 1978, Vol. ASSP-26, 43–49).
6. Signal comparison of all (filtered) signals of the other behavioral patterns against the "typical" signal form in accordance with the same process, and determination of (impermissible) similarity coefficients as compared with the other behavioral patterns.
7. Establishment of the confidence interval of the similarity coefficient for the signal comparison with respect to the "typical" signal form.
8. In the event that no clear delimitation of the confidence interval should be possible, either the "typical" signal form can be modified (elimination of "outliers"), or another frequency band can be evaluated.
9. Repetition of points 1 to 8 for the other behavioral patterns.

After the completion of this process step, precisely defined specified processing references and processing specifications (FIG. 1d) are established, by means of which a vibration signal is either correlated with one of the behavioral patterns or rejected as unknown. The reliability of the signal detection is dependent upon the specified processing references and processing specifications employed.

The last process step according to the invention (FIG. 2) is, in particular, the automatic execution of signal detection (in accordance with the prescribed processing references and processing specifications of FIG. 1d) and the result output.

Figure 2:
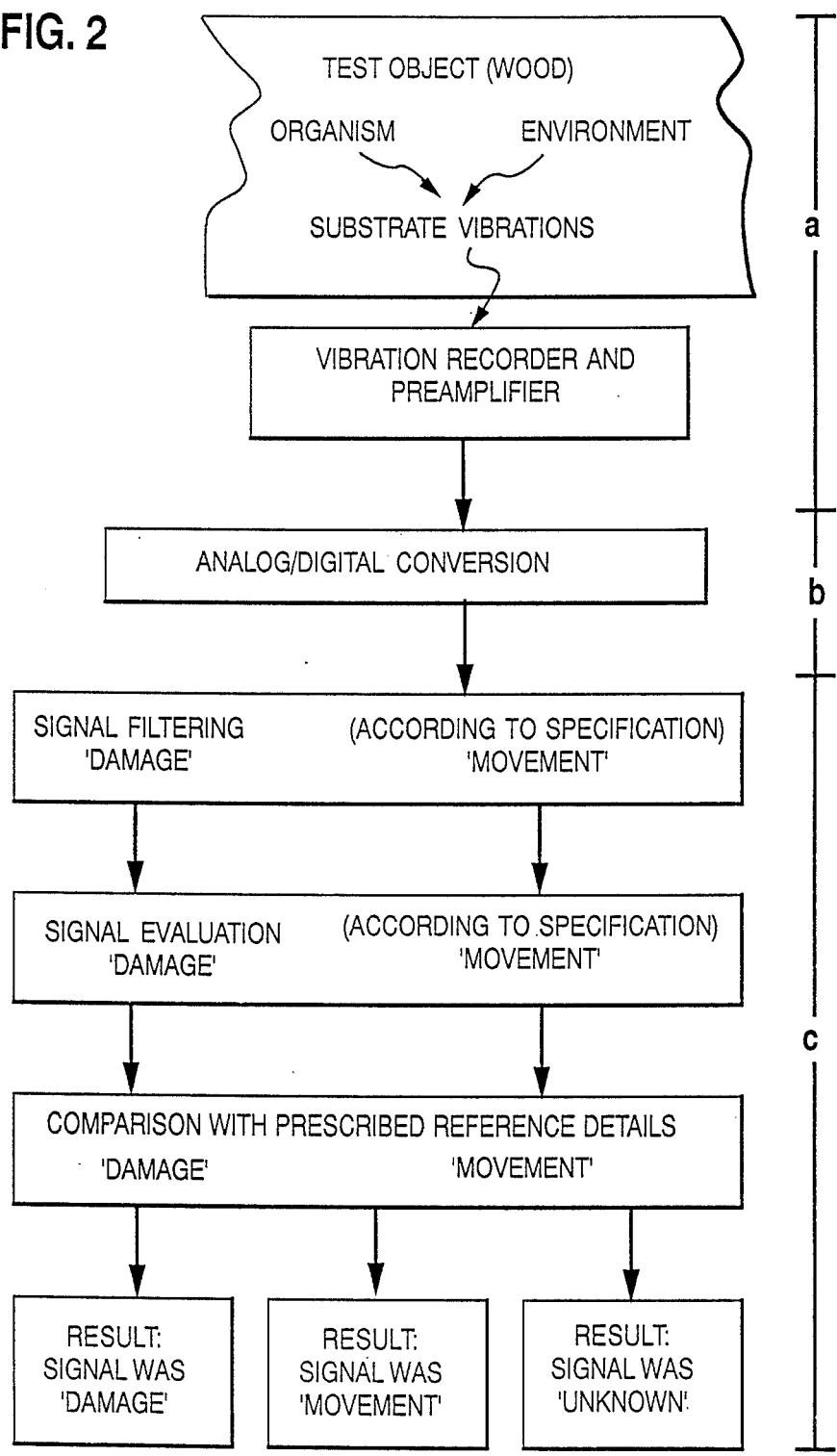
FIG. 2 shows the progress diagram of the process according to the invention, which is at the same time the functional principle of the device, according to the invention, for carrying out the process.

FIG. 2 shows the sequence of the process according to the invention and, at the same time, the functional principle of the invention, for the detection of behavioral patterns with reference to the example of a practice-related application (detection of attack by noxious organisms in the roof truss).

A mixture of "interfering" signals (from the environment) and of "useful" signals (generated by the organism) passes out of the wood to the vibration recorder and is in the first instance amplified (FIG. 2a).

This signal mixture is fed to an analog/digital converter, which measures the analog input signal and converts it into a (digitally usable) sequence of numbers (FIG. 2b).

A microcomputer system (FIG. 2c) detects this sequence of numbers and in the first instance executes signal filtering in accordance with the prescribed details of FIG. 1d. To the extent that the computing power of the hardware employed is not sufficient for a digital signal filtering, this signal filtering takes place already before the analog/digital converter.

The signal preprocessed in this manner is (in accordance with the prescribed details of FIG. 1d) evaluated and compared with the prescribed references (see FIG. 1d). If it was possible to discover a behavior-typical pattern in the signal mixture, then the behavior (in this case: "DAMAGE" or "MOVEMENT") is output as the result, otherwise "UNKNOWN" or the like.

In this way, in the case of the above indicated practice-related application (detection of attack by noxious organisms in the roof truss), it is possible to make rapidly, reliably and in a manner free from destruction, the statement as to whether attack by noxious organisms is present; over and above this, it is also possible to determine the nature of the noxious organism (by multiple tests or process modifications).

The device according to the invention can be fitted or secured as a complete unit on the object to be tested. According to another embodiment, the recorders and preamplifiers can be secured to the test object separately from the microcomputer and analog/digital converter. In this case, the collected signals are passed via connecting lines to the microcomputer.

With the aid of the process, according to the invention, the temporal progression of the effectiveness of a treatment with wood protection agent may be established in a simple manner and without great expenditure of time, whether it be in the case of a preventive wood protection treatment or in the case of wood already attacked by noxious insects or insect larvae. The decline of the activity of noxious insects or insect larvae may be ascertained by means of a plotted time-action curved.

It is accordingly not necessary, as previously, to undertake a splitting of the small pieces of wood attacked in the course of test experiments, in order to be able to examine the number of noxious insects or insect larvae killed.

Over and above this, it is possible, with the aid of the device according to the invention, to carry out a permanent monitoring of valuable wooden objects set up in premises or regions which are particularly at risk.

According to an advantageous embodiment of the process, the position of the noxious insects or insect larvae in the substrate attacked, preferably wood, can also be established in anon-destructive manner, it is possible to undertake a controlled treatment of extended objects with wood protection agents.

Figure 3:
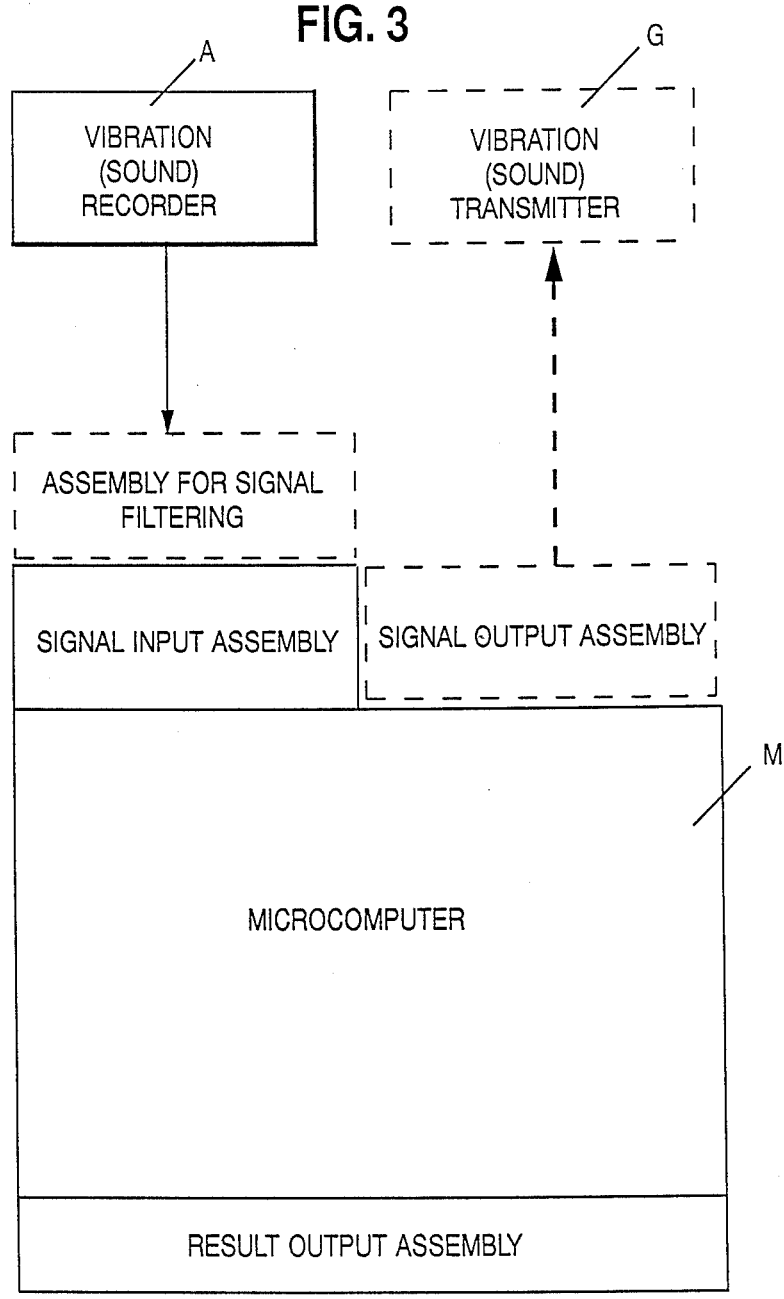
FIG. 3 shows the device, according to the invention, for the automatic detection of insect and larval behavioral patterns.

FIG. 3 shows diagrammatically the assemblies of the device, according to the invention, for carrying out the process; in this connection, not all assemblies and recorders or transmitters which have been represented need necessarily to be present; the existence or omission of individual components will be decided by the requirements which (depending upon the type of organism and of wood in each instance) are placed on the signal detection.

Over and above this, for example, the assembly for the signal filtering can be dispensed with if the computing power of the microprocessor permits a digital signal filtering or if this filtering is executed by a specific signal processor.

According to a particular embodiment of the process according to the invention and of the device according to the invention, it is possible to establish the position of insects or insect larvae, living in a solid substrate (wood), in their substrate, preferably wood. The process utilizes the substrate vibrations or sound, generated by these organisms themselves, for the determination of position. Using two or more vibration recorders or sonometers, these vibrations or sound are picked off at least two opposite sides of the substrate, and the time difference with which the signals reach the recorders is measured. The location of the organism in the wood may be precisely determined from the time differences and having regard to the speed of propagation of the signals in the wood. A quasi-passive "echo sounding" principle is used for the determination of position.

What is claimed is:

1. A process for the detection of insects in a solid substrate, comprising the steps of:
    (a) measuring the substrate for vibration or noise caused by damage or movement of the insects in the substrate, the measurement being made free from interfering signals;
    (b) obtaining specific signal properties for each vibration or noise behavioral reference pattern of the insects by digital signal computer processing;
    (c) applying the reference pattern data to a microcomputer;
    (d) obtaining data of on-going insect damage by recording substrate vibrations or noises, or both, and converting these vibrations or noises to digital form;
    (e) comparing the movement and damage data to reference data; and
    (f) developing from the comparison of step (e) an indication of either damage or movement, or the absence of either.

2. The process of claim 1, in which step (b) is carried out by means of frequency analysis.

3. The process of claim 1, further including in step (d) the filtering of interfering signals and the analyzing as data of only useful signals indicative of actual insect activity.

4. The process of claim 1, in which insect sounds are recorded from at least two opposite sides of the substrate.

5. The process of claim 2, in which the noise analyzed is in the frequency range of from $0.01 \times 10^{-3}$ Hz to 150 kHz.

6. A system for the detection of insects in a solid substrate, with means for analyzing under natural conditions the damage and movement patterns of the insects to be detected and for measuring the actual damage and movement occurring in a solid substrate, comprising;

means for developing standardized behavioral patterns from the analysis; and a microcomputer means for comparing the standardized behavioral patterns to the actually observed patterns, whereby the presence or absence of damage can be discerned.

7. The system of claim 6, in which actual damage and movement is determined by recordation of both vibration and noise in a substrate inhabited by the insects to be detected.

* * * * *